United States Patent
Kim et al.

(10) Patent No.: US 7,720,381 B2
(45) Date of Patent: May 18, 2010

(54) OPTICAL TRANSMISSION APPARATUS AND OPTICAL ACCESS NETWORK FOR WAVELENGTH-DIVISION MULTIPLEXING OPTICAL NETWORK WITH BOTH SUB-CARRIER MULTIPLEX AND SUB-CARRIER MULTIPLE ACCESS SCHEMES

(75) Inventors: Byoung Whi Kim, Daejeon (KR); Seung Hyun Jang, Daejeon (KR); Chul Soo Lee, Daejeon (KR); Eul Suk Jung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 739 days.

(21) Appl. No.: 11/634,639

(22) Filed: Dec. 6, 2006

(65) Prior Publication Data

US 2007/0147838 A1 Jun. 28, 2007

(30) Foreign Application Priority Data

Dec. 7, 2005 (KR) .................. 10-2005-0119064
Apr. 26, 2006 (KR) .................. 10-2006-0037756

(51) Int. Cl.
*H04J 14/00* (2006.01)
(52) U.S. Cl. ..................................... 398/72
(58) Field of Classification Search ............. 398/66–67, 398/70–71, 76, 79, 82, 89, 95, 72
See application file for complete search history.

(56) References Cited

U.S. PATENT DOCUMENTS

| | | | |
|---|---|---|---|
| 5,798,858 A | 8/1998 | Bodeep et al. | |
| 2004/0264683 A1* | 12/2004 | Bye | 379/402 |
| 2005/0078356 A1* | 4/2005 | Kwon et al. | 359/337 |
| 2005/0129402 A1* | 6/2005 | Kim et al. | 398/79 |

FOREIGN PATENT DOCUMENTS

GB 2 294 372 4/1996

OTHER PUBLICATIONS

"Optical Beat Noise Suppression and Power Equalization in Subcarrier Multiple Access Passive Optical Networks by Downstream Feedback" by S. Soerensen; *Journal of Lightwave Technology*, Vo. 18, No. 10, Oct. 2000; pp. 1337-1347.

* cited by examiner

*Primary Examiner*—Quan-Zhen Wang
(74) *Attorney, Agent, or Firm*—Blakely, Sokoloff, Taylor & Zafman LLP

(57) ABSTRACT

Provided are an optical transmission apparatus and an optical access network for a wavelength-division multiplexing optical network with sub-carrier multiplex and sub-carrier multiple access schemes. The optical transmission apparatus includes: a multiplexer and/or demultiplexer demultiplexing M forward A band optical signals having wavelengths each comprising a plurality of sub-carriers and multiplexing M backward B band optical signals having wavelengths each comprising a plurality of sub-carriers; a plurality of optical power splitters splitting each of the M forward A band optical signals into N optical signals; a plurality of optical receivers receiving backward optical signals belonging to a C band; and M optical transmitters converting the backward optical signals in the C band into the M backward B band optical signals.

14 Claims, 4 Drawing Sheets

OPTICAL TRANSMISSION APPARATUS AND OPTICAL ACCESS NETWORK FOR WAVELENGTH-DIVISION MULTIPLEXING OPTICAL NETWORK WITH BOTH SUB-CARRIER MULTIPLEX AND SUB-CARRIER MULTIPLE ACCESS SCHEMES

CROSS-REFERENCE TO RELATED PATENT APPLICATION

This application claims the benefit of Korean Patent Application No. 10-2005-0119064, filed on Dec. 7, 2005 and No. 10-2006-0037756, filed on Apr. 26, 2006 in the Korean Intellectual Property Office, the disclosures of which are incorporated herein in their entirety by reference.

BACKGROUND OF THE INVENTION

1. Field of the Invention

The present invention relates to a wavelength-division multiplexing optical access network, and more particularly, to an optical transmission apparatus and an optical access network for a wavelength-division multiplexing optical network with both sub-carrier multiplex and sub-carrier multiple access schemes.

2. Description of the Related Art

Digital subscriber line (xDSL) technologies have been developed to provide data services to subscribers using existing telephone lines. Also, data service schemes have been suggested to provide data services through cable networks using coaxial cables.

Such existing data service technologies do not have problems in terms of supporting telephone traffic and Internet traffic. If ultrahigh speed services such as remote video conferences, high definition television (HDTV) services, remote education, remote diagnoses and treatments are generally available to subscribers, the existing data service technologies are limited by bandwidth and distance, and thus are not able to provide sufficient wideband, high quality services.

Optical access network technologies have been suggested in order to provide wideband, high quality services to users. In particular, wavelength-division multiplexing optical networks have been recently studied as optical access network technologies.

The wavelength-division multiplexing optical access networks are attractive as next generation access networks since the wavelength-division multiplexing optical access networks can provide a large amount of information to subscribers, and are highly secure.

However, the wavelength-division multiplexing optical access networks are costly in terms of installation and maintenance.

Different from Back-Bone networks having a small number of channels and high transmission speeds, in general the access networks require relatively low transmission speeds and include a large number of channels. Thus, new networks are required to be capable of accommodating a large number of subscribers using a small amount of communication resources, i.e., maximizing the number of subscribers per a single optical fiber, which as a result solves the cost reduction issue.

The schemes, each wavelength optical channel of wavelength division multiplexing optical access network joined with TDM or TDMA, sub-carrier multiplex and sub-carrier multiple access networks using a large number of sub-carriers to accommodate a large number of subscribers are considered as alternative options.

The advantages and disadvantages of time-division multiplex and time-division multiple access schemes and sub-carrier multiplex and sub-carrier multiple access schemes will now be described in more detail.

In the time-division multiplex and time-division multiple access schemes, data of a large number of subscribers is statistically multiplexed in order to efficiently use resources. However, accurate synchronization is required, and the states and requests from subscribers affect the access of other subscribers, and packet overheads increase due to periodical polling and ranging.

In the sub-carrier multiplex and sub-carrier multiple access schemes, different sub-carriers are allocated to subscribers sharing an optical fiber, the information are transmitted through the allocated sub-carriers to each of subscribers, and at the receivers the information are filtered through sub-carrier band pass filters assigned to each of the subscribers.

Optical access networks using sub-carrier multiple access schemes do not suffer from the increase in overhead as in those using time division multiple access caused by timing synchronization, periodical polling, and ranging. However, optical beat interferences (OBIs) may occur in signal bands when receivers in the central base stations simultaneously receive a plurality of light sources. As a result, the OBIs lower a signal-to-noise ratio (SNR).

SUMMARY OF THE INVENTION

The present invention provides an optical transmission apparatus and an optical access network for a wavelength-division multiplexing optical network with a sub-carrier multiplex scheme and a sub-carrier multiple access scheme with which optical beat interferences (OBIs) at optical receivers in a central base station can be avoided and thus a signal-to-noise ratio (SNR) can be improved.

According to an aspect of the present invention, there is provided an optical transmission apparatus for a wavelength-division multiplexing optical network, including: a multiplexer and/or demultiplexer demultiplexing M forward A band optical signals having wavelengths each comprising a plurality of sub-carriers and multiplexing M backward B band optical signals having wavelengths each including a plurality of sub-carriers; a plurality of optical power splitters splitting each of the M forward A band optical signals into N optical signals; a plurality of optical receivers receiving backward optical signals belonging to a C band; and M optical transmitters converting the backward optical signals in the C band into the M backward B band optical signals.

According to another aspect of the present invention, there is provided an optical access network for a wavelength-division multiplexing optical network, including a central base station, a local base station connected to the central base station through an optical fiber, and a plurality of subscriber nodes connected to the local base station. The optical access network may include: a plurality of optical transmitters positioned in the subscriber nodes, converting data into C band optical signals, and backward transmitting the C band optical signals; a plurality of optical receivers positioned in the local base station and receiving the C band optical signals; M optical transmitters converting the C band optical signals into M backward B band optical signals; a multiplexer multiplexing the M backward B band optical signals; a demultiplexer positioned in the central base station and demultiplexing the multiplexed M backward B band optical signals; M optical receivers converting the demultiplexed M backward B band optical signals into electric signals; a plurality of sub-carrier receivers filtering predetermined frequency band sub-carriers from the electric signals; and MODEM units demodulating the data from the sub-carriers.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, embodiments of the present invention will be described in detail with reference to the attached drawings.

Figure 1:
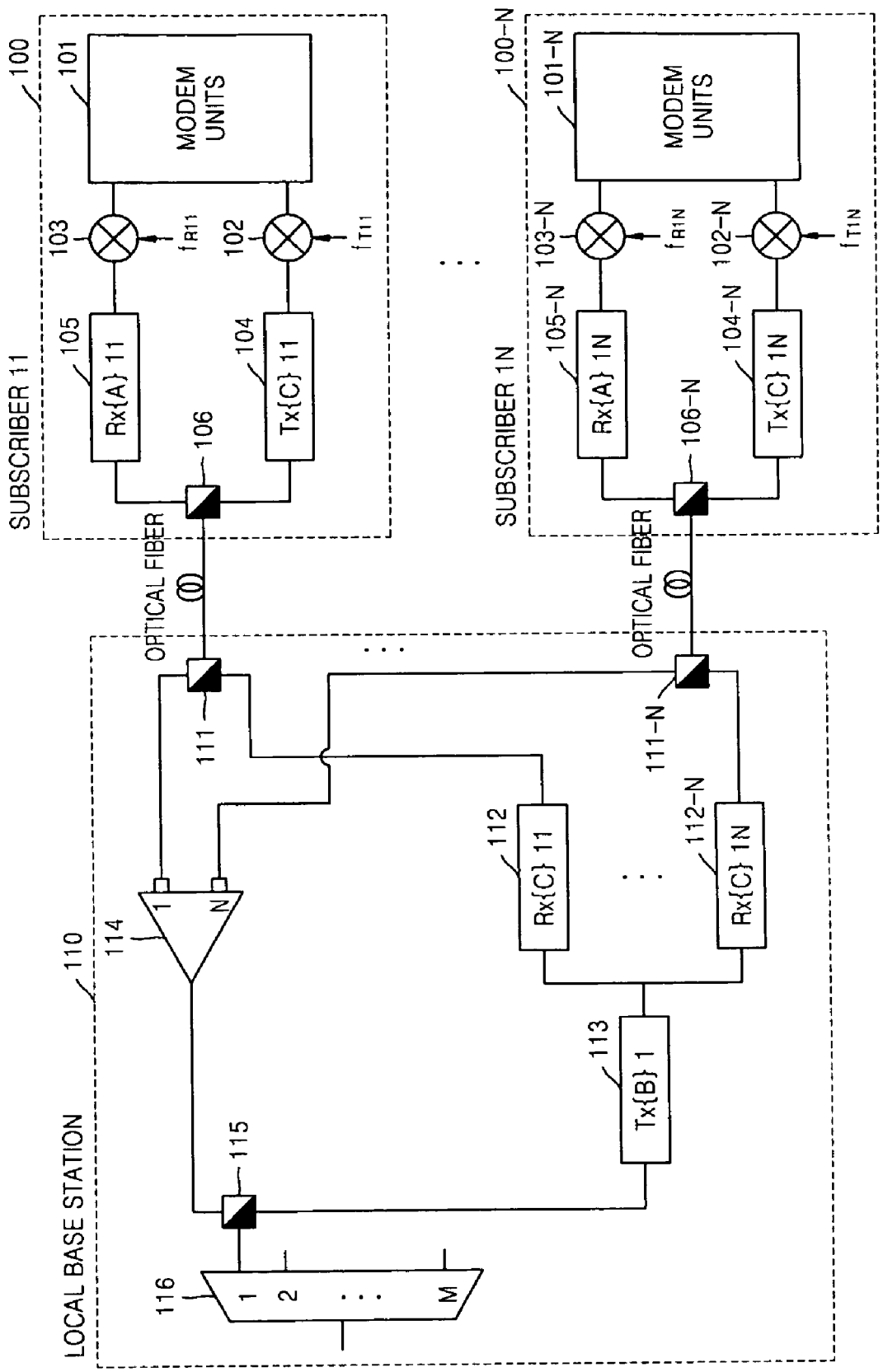
FIG. 1 is a block diagram illustrating a transmission method and a structure of an optical access network for a wavelength-division multiplexing optical network with sub-carrier multiplex and sub-carrier multiple access schemes according to an embodiment of the present invention.

FIG. 1 is a block diagram illustrating a transmission method and a structure of an optical access network for a wavelength-division multiplexing optical network with sub-carrier multiplex and sub-carrier multiple access schemes according to an embodiment of the present invention. Referring to FIG. 1, subscriber nodes 100 through 100-N include modulation and/or demodulation (MODEM) units 101 through 101-N, sub-carrier signal transmitters 102 through 102-N, sub-carrier signal receivers 103 through 103-N, C band optical transmitters 104 through 104-N, and A band optical receivers 105 through 105-N, modulate information concerning subscribers into signals, which can be transmitted to a network, and C and/or A band optical filters 106 through 106-N. The MODEM units 101 modulate information concerning subscribers into signals transmittable to a network and demodulate the signals into subscriber information. The sub-carrier signal transmitters 102 through 102-N convert intermediate frequencies of signals output from the MODEM units 101 through 101-N into arbitrary sub-carrier frequencies. The sub-carrier signal receivers 103 through 103-N convert signals in sub-carrier frequency bands into frequencies the MODEM units 101 through 101-N may receive. The C band optical transmitters 104 through 104-N convert signals output from the sub-carrier signal transmitters 102 through 102-N into optical signals and transmit the optical signal. The A band optical receivers 105 through 105-N receive A band forward optical signals and output sub-carrier signals. The C and/or A band optical filters 106 through 106-N are connected to the C band optical transmitters 104 through 104-N and the A band optical receivers 105 through 105-N, and split and/or couple light having respective band wavelengths.

A local base station 110 includes C and/or A band optical filters 111 through 111-N, optical receivers 112 through 112-N, a B band optical transmitter 113, an optical power splitter 114, a B and/or A band optical filter 115, and an optical multiplexer and/or demultiplexer 116.

Each of the C and/or A band optical filters 111 through 111-N is connected to each of the C and/or A band optical filters 106 through 106-N through a strand of optical fiber to split and/or couple light having C and/or A band wavelengths. The optical receivers 112 through 112-N receive C band subscriber optical signals split by the C and/or A band optical filters 111 through 111-N. The B band optical transmitter 113 couples subscriber sub-carrier signals output from the optical receivers 112 through 112-N into an optical signal and outputs the optical signal. The optical power splitter 114 is connected to the C and/or A band optical filters 111 through 111-N to split A band forward optical signals. The B and/or A band optical filter 115 is connected to the optical power splitter 114 and the B band optical transmitter 113 to split and/or couple light having B and/or A band wavelengths. The optical multiplexer and/or demultiplexer 116 is connected to the B and/or A band optical filter 115 to wavelength-division multiplex and/or demultiplex light having B and/or A band wavelengths.

Since a point-to-point transmission is performed between the subscriber nodes 100 through 100-N and the local base station 110, low-priced Fabry-perot laser diodes (FP-LDs) may be used as subscriber light sources in the C band optical transmitters 104 through 104-N.

Figure 2:
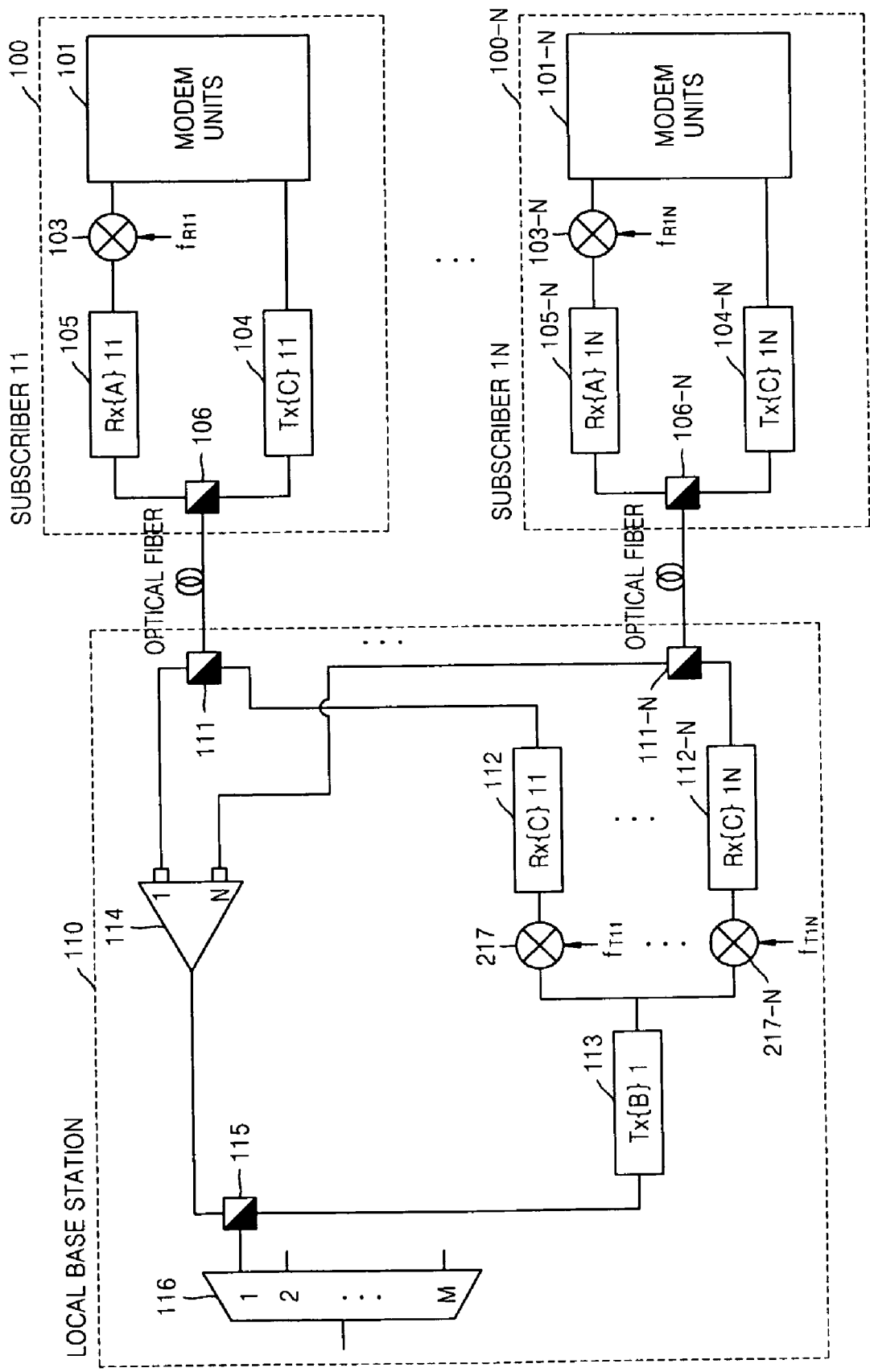
FIG. 2 is a block diagram illustrating a transmission method and a structure of an optical access network for a wavelength-division multiplexing optical network with sub-carrier multiplex and sub-carrier multiple access schemes according to another embodiment of the present invention.

FIG. 2 is a block diagram illustrating a transmission method and a structure of an optical access network for a wavelength-division multiplexing optical network with sub-carrier multiplex and sub-carrier multiple access schemes according to another embodiment of the present invention. In the present embodiment, the sub-carrier signal transmitters 102 through 102-N illustrated in FIG. 1 may be positioned in a local base station 110 illustrated in FIG. 2.

Subscriber nodes 100 through 100-N include MODEM units 101 through 101 -N, sub-carrier signal receivers 103 through 103-N, C band optical transmitters 104 through 104-N, A band optical receivers 105 through 105-N, and C and/or A band optical filters 106 through 106-N.

The MODEM units 101 through 101-N modulate information concerning subscribers into transmittable signals and demodulate the transmitted signals into subscriber information. The sub-carrier signal receivers 103 through 103-N receive and convert signals in sub-carrier frequency bands into frequencies the MODEM units 101 through 101-N may receive. The C band optical transmitters 104 through 104-N convert signals output from the MODEM units 101 through 101-N into optical signals and transmit the optical signals. The optical receivers 105 through 105-N receive A band forward optical signals and output sub-carrier signals. The C and/or A band optical filters 106 through 106-N are connected to the C band optical transmitters 104 through 104-N and the A band optical receivers 105 through 105-N to split and/or couple light having respective band wavelengths.

A local base station 110 includes C and/or A band optical filters 111 through 111-N, optical receivers 112 through 112-N, sub-carrier signal transmitters 217 through 217-N, a B band optical transmitter 113, an optical power splitter 114, a B and/or A band optical filter 115, and an optical multiplexer and/or demultiplexer 116.

Each of the C and/or A band optical filters 111 through 111-N is connected to each of the C and/or A band optical filters 106 through 106-N through a strand of optical fiber to split and/or couple light having C and/or A band wavelengths. The optical receivers 112 through 112-N receive C band subscriber optical signals split by the C and/or A band optical filters 111 through 111-N. The sub-carrier signal transmitters 217 through 217-N convert intermediate frequencies of signals output from the optical receivers 112 through 112-N into sub-carrier frequencies. The B band optical transmitter 113 couples signals output from the sub-carrier signal transmitters 217 through 217-N into an optical signal and transmit the optical signal. The optical power splitter 114 is connected to the C and/or A band optical filters 111 through 111-N to split A band forward optical signals. The B and/or A band optical filter 115 is connected to the optical power splitter 114 and the B band optical transmitter 113 to split and/or couple light having B and/or A band wavelengths. The optical multiplexer and/or demultiplexer 116 is connected to the B and/or A band optical filter 115 to wavelength-division multiplex and/or demultiplex light having wavelengths in the B and A bands.

The optical access network illustrated in FIG. 1 including a central base station according to an embodiment of the present invention will be described with reference to FIGS. 3 and 4.

Figure 3:
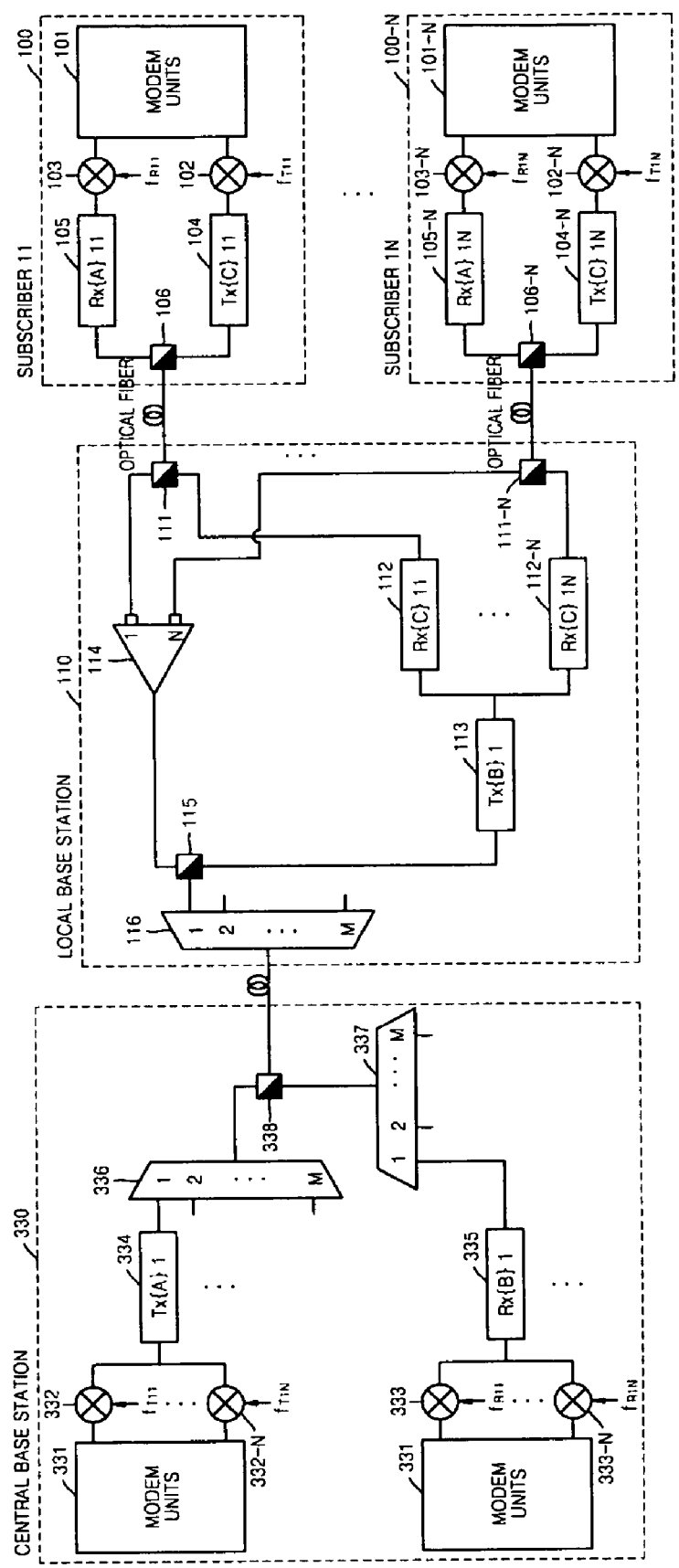
FIG. 3 is a block diagram illustrating the optical access network illustrated in FIG. 1 including a central base station according to an embodiment of the present invention.

FIG. 3 is a block diagram illustrating the optical access network illustrated in FIG. 1 including a central base station according to an embodiment of the present invention. Referring to FIG. 3, a central base station 330 includes MODEM units 331 through 331-N, sub-carrier signal transmitters 332 through 332-N, sub-carrier signal receivers 333 through 333-N, A band optical transmitters 334 through 334-M, optical receivers 335 through 335-M, an optical multiplexer 336, an optical demultiplexer 337, and an A and/or B band optical filter 338. The MODEM units 331 through 331-N operate as the MODEM units 101 through 101-N of the subscriber nodes 100 through 100-N as illustrated in FIG. 1. The sub-carrier signal transmitters 332 through 332-N convert intermediate frequencies of signals output from the MODEM units 331 through 331-N into arbitrary/preassigned sub-carrier frequencies. The sub-carrier signal receivers 333 through 333-N convert signals in sub-carrier frequency bands into frequencies the MODEM units 331 through 331-N may receive. The A band optical transmitter 334 converts signals output from the sub-carrier signal transmitters 332 through 332-N into optical signals and transmits the optical signals. The optical receiver 335 receives a backward B band optical signal and outputs sub-carrier signals. The optical multiplexer 336 is connected to the A band optical transmitters 334 through 334-M to wavelength-division multiplex lights having A band wavelengths. The optical demultiplexer 337 is connected to the optical receivers 335 through 335-M to demultiplex lights having B band wavelengths. The A and/or B band optical filter 338 is connected to the optical multiplexer 336 and the optical demultiplexer 337 to split and/or couple light having A and/or B band wavelengths.

Figure 4:
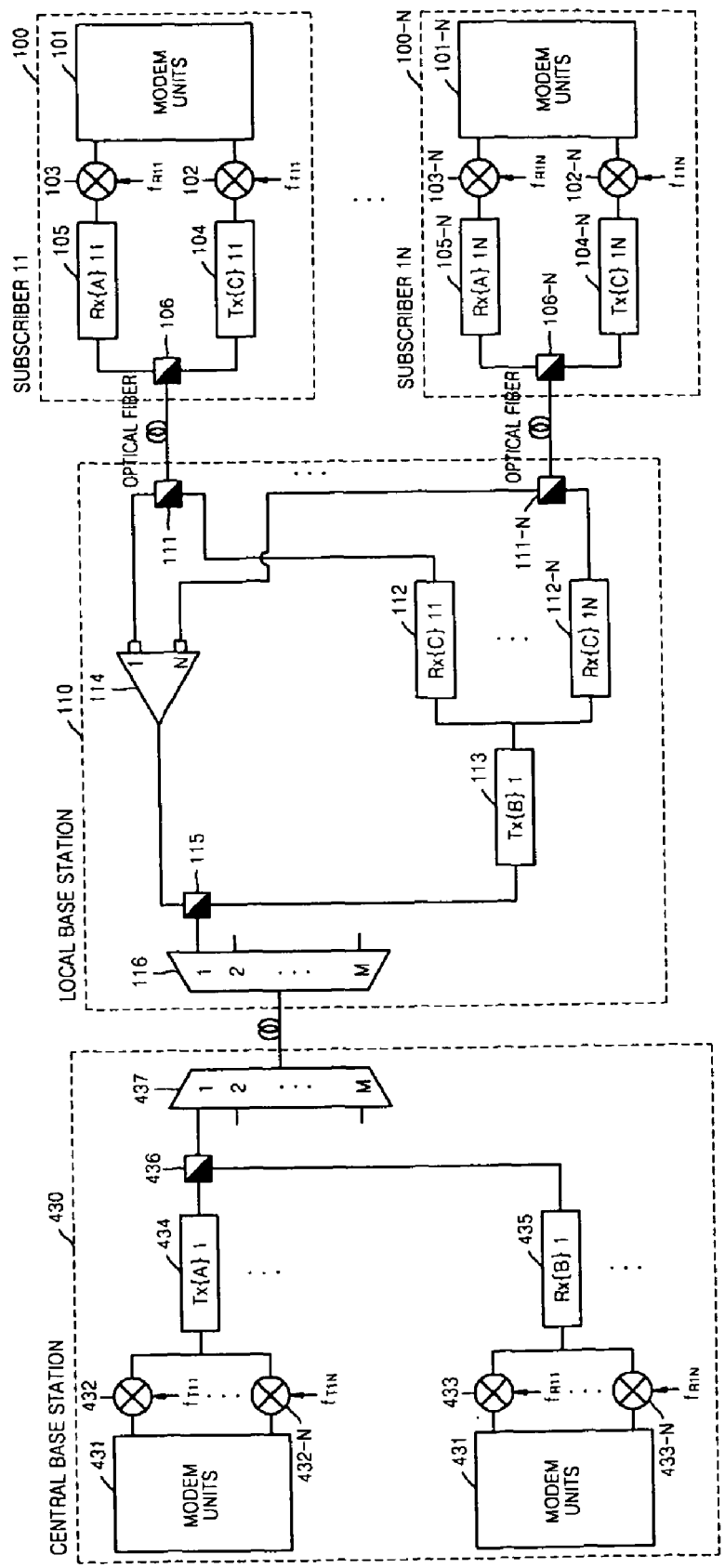
FIG. 4 is a block diagram illustrating the optical access network illustrated in FIG. 1 including a central base station according to another embodiment of the present invention.

FIG. 4 is a block diagram illustrating the optical access network illustrated in FIG. 1 including a central base station according to another embodiment of the present invention. Referring to FIG. 4, a central base station 430 includes MODEM units 431 through 431-N, sub-carrier signal transmitters 432 through 432-N, sub-carrier signal receivers 433 through 433-N, A band optical transmitters 434 through 434-M, optical receivers 435 through 435-M, A and/or B band optical filters 436 through 436-M, and an optical multiplexer and/or demultiplexer 437.

The MODEM units 431 through 431-N operate as the MODEMs 101 through 101-N of the subscriber nodes 100 through 100-N illustrated in FIG. 1. The sub-carrier signal transmitters 432 through 432-N convert intermediate frequencies of signals output from the MODEM units 431 through 431-N into arbitrary/preassigned sub-carrier frequencies. The sub-carrier signal receivers 433 through 433-N convert signals in sub-carrier frequency bands into frequencies the MODEM units 431 through 431-N may receive. The A band optical transmitters 434 through 434-M convert signals output from the sub-carrier signal transmitters 432 through 432-N into optical signals and transmit the optical signals. The optical receivers 435 through 435-M receive backward B band optical signals and output sub-carrier signals. The A and/or B band optical filters 436 through-M are connected to the A band optical transmitters 434 through 434-M and the optical receivers 435 through 435-M to split and/or couple lights having A and/or B band wavelengths. The optical multiplexer and/or demultiplexer 437 is connected to the A and/or B band optical filters 436 through 436-M to wavelength-division multiplex and/or demultiplex light having A and B band wavelengths.

The optical access network illustrated in FIG. 2 including the local base station 110, in which the sub-carrier signal receivers 102 through 102-N are positioned, may include the central base stations 330 or 430 illustrated in FIGS. 3 or 4.

As described above, according to the present invention, an optical access network can reduce installation and maintenance costs by using a wavelength-division multiplex optical network with sub-carrier multiplex and sub-carrier multiple access schemes and a bi-directional optical communication technique for performing backward and/or forward communications through a strand of optical fiber.

In the case of the sub-carrier multiple access scheme, a local base station can receive a plurality of subscriber sub-carrier optical signals and transmit the plurality of subscriber sub-carrier optical signals to an optical transmitter. Thus, optical beat interferences (OBIs) do not occur in receivers of a central base station so as to improve a signal-to-noise ratio. As a result, signal quality can be increased, and a larger number of subscribers can be accommodated.

Since the OBIs do not occur, a number of subscribers limited by thermal noise can be accommodated.

The invention can also be embodied as computer readable codes on a computer readable recording medium. The computer readable recording medium is any data storage device that can store data that can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An optical transmission apparatus for a wavelength-division multiplexing optical network, comprising:
    a multiplexer and/or demultiplexer demultiplexing M forward, wherein "M" represents an integer greater than 1, first band optical signals having wavelengths each comprising a plurality of sub-carriers and multiplexing M backward second band optical signals having wavelengths each comprising a plurality of sub-carriers;
    a plurality of optical power splitters splitting each of the M forward first band optical signals into N optical signals, wherein "N" represents an integer greater than 1;
    a plurality of optical receivers receiving backward optical signals belonging to a third band; and
    M optical transmitters converting the backward optical signals in the third band into the M backward second band optical signals.

2. The optical transmission apparatus of claim 1, wherein the multiplexer and/or demultiplexer, the plurality of optical power splitters, the plurality of optical receivers, and the M optical transmitters are positioned in a local base station wavelength-division multiplexing and transmitting the M backward second band optical signals.

3. The optical transmission apparatus of claim 2, further comprising a plurality of sub-carrier signal transmitters converting intermediate frequencies of signals output from the plurality of optical receivers into predetermined sub-carrier frequencies, and the M optical transmitters convert at least one or more of the sub-carriers into the M backward second band optical signals.

4. The optical transmission apparatus of claim 1, wherein the forward optical signals in the third band are optical signals comprising predetermined sub-carriers carrying data.

5. The optical transmission apparatus of claim 1, further comprising:
   a plurality of second and/or first band optical filters splitting and/or coupling one of the demultiplexed forward first band optical signals and one of the backward second band optical signals; and
   a plurality of third and/or first band optical filters splitting and/or coupling one of the N optical signals and one of the backward optical signals in the third band.

6. The optical transmission apparatus of claim 1, further comprising:
   a plurality of sub-carrier transmitters converting data into sub-carriers in a predetermined frequency band;
   M optical transmitters converting at least one or more of the sub-carriers into M first band optical signals;
   a multiplexer multiplexing the M first band optical signals, wherein the plurality of sub-carrier transmitters, the M optical transmitters, and the multiplexer are positioned in a central base station multiplexing and transmitting the M first band optical signals.

7. The optical transmission apparatus of claim 1, further comprising:
   optical receivers receiving one of the N optical signals as an electric signal;
   sub-carrier signal receivers filtering predetermined frequency band sub-carriers from the electric signal; and
   modulation and/or demodulation (MODEM) units demodulating the filtered sub-carriers into subscriber data, wherein the optical receivers, the sub-carrier signal receivers, and the MODEM units are positioned in subscriber nodes providing subscriber services to subscribers.

8. The optical transmission apparatus of claim 1, further comprising:
   a second and/or first band optical filter splitting and/or coupling the multiplexed M backward second band optical signals and the M forward first band optical signals;
   a demultiplexer demultiplexing the multiplexed M backward second band optical signals;
   M optical receivers converting the demultiplexed optical signals into electric signals;
   a plurality of sub-carrier receivers filtering predetermined frequency band sub-carriers from the electric signals; and
   a plurality of MODEM units demodulating data transmitted from the subscriber nodes from the predetermined frequency band sub-carriers, wherein the second and/or first band optical filter, the demultiplexer, the M optical receivers, the plurality of sub-carrier receivers, and the plurality of MODEM units are positioned in a central base station multiplexing and forward transmitting the M forward first band optical signals.

9. The optical transmission apparatus of claim 1, further comprising:
   a plurality of sub-carrier transmitters converting data of subscribers into sub-carriers in a predetermined frequency band; and
   a plurality of optical transmitters converting at least one or more of the sub-carriers into optical signals in a third band, wherein the plurality of sub-carrier transmitters and the plurality of optical transmitters are positioned in subscriber nodes providing subscriber services to the subscribers.

10. The optical transmission apparatus of claim 9, wherein the plurality of optical transmitters are FP-LDs (Fabry Perot Laser Diodes).

11. An optical access network for a wavelength-division multiplexing optical network, comprising a central base station, a local base station connected to the central base station through an optical fiber, and a plurality of subscriber nodes connected to the local base station, the optical access network comprising:
   a plurality of optical transmitters positioned in the subscriber nodes, converting data into third band optical signals, and backward transmitting the third band optical signals;
   a plurality of optical receivers positioned in the local base station and receiving the third band optical signals;
   M optical transmitters converting the third band optical signals into M backward second band optical signals;
   a multiplexer multiplexing the M backward second band optical signals;
   a demultiplexer positioned in the central base station and demultiplexing the multiplexed M backward second band optical signals;
   M optical receivers converting the demultiplexed M backward second band optical signals into electric signals;
   a plurality of sub-carrier receivers filtering predetermined frequency band sub-carriers from the electric signals; and
   MODEM units demodulating the data from the sub-carriers.

12. The optical access network of claim 11, further comprising:
   a multiplexer positioned in the central base station and multiplexing and outputting M forward first band optical signals having wavelengths each comprising a plurality of sub-carriers;
   a demultiplexer positioned in the local base station and demultiplexing the M forward first band optical signals;
   a plurality of optical power splitters splitting the demultiplexed M forward first band optical signals into N optical signals; optical receivers positioned in the subscriber nodes receiving one of the N optical signals, and converting the received optical signal into an electric signal;
   a sub-carrier signal receiver filtering predetermined frequency band sub-carriers from the electric signal; and
   MODEM units demodulating the filtered sub-carriers into subscriber data.

13. The optical access network of claim 11, wherein the third band optical signals are optical signals comprising predetermined frequency band sub-carriers carrying the data.

14. The optical access network of claim 11, further comprising a plurality of sub-carrier signal transmitters converting intermediate frequencies of signals output from the optical receivers of the local base station into predetermined sub-carrier frequencies, wherein the plurality of sub-carrier signal transmitters convert at least one or more of the sub-carriers into the second band optical signal.

* * * * *